(12) United States Patent
Guruswamy (10) Patent No.: US 11,726,804 B1
(45) Date of Patent: Aug. 15, 2023

(54) SYSTEMS AND METHODS FOR WEB CONTENT ORCHESTRATION

(71) Applicant: FMR LLC, Boston, MA (US)

(72) Inventor: Mohan Kumar Guruswamy, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/903,182

(22) Filed: Sep. 6, 2022

(51) Int. Cl.
- *G06F 15/16* (2006.01)
- *G06F 9/451* (2018.01)
- *G06F 40/186* (2020.01)
- *G06F 16/958* (2019.01)

(52) U.S. Cl.
CPC .......... *G06F 9/453* (2018.02); *G06F 16/972* (2019.01); *G06F 40/186* (2020.01)

(58) Field of Classification Search
CPC ....... G06F 9/453; G06F 16/972; G06F 40/186
See application file for complete search history.

(56) References Cited

U.S. PATENT DOCUMENTS

| | | | |
|---|---|---|---|
| 7,922,493 B1 * | 4/2011 | Gennaro | G06Q 10/0875 705/29 |
| 8,195,321 B2 * | 6/2012 | Mackelprang | G06Q 10/06 700/100 |
| 9,282,145 B2 | 3/2016 | Wei et al. | |
| 9,715,370 B2 | 7/2017 | Friedman et al. | |
| 10,922,060 B1 | 2/2021 | Ward | |
| 11,328,032 B1 * | 5/2022 | Kwok | G06F 3/017 |
| 2002/0065877 A1 * | 5/2002 | Kowtko | G06Q 30/06 709/217 |

FOREIGN PATENT DOCUMENTS

CN 114138269 A * 3/2022

* cited by examiner

*Primary Examiner* — Hassan Mrabi
(74) *Attorney, Agent, or Firm* — Cesari and McKenna, LLP (57) ABSTRACT

A computer-implemented method is provided for guiding a user to create one or more templates for assembling a demo workflow. The method includes filtering a plurality of web content uploaded by a user to remove unwanted material including references to external files and unreachable links so that the plurality of web content are stand-alone content, and presenting to the user a graphical user interface for building a plurality of templates using the filtered web content. The graphical user interface is configured to allow the user to choose one or more filtered web content to populate each template. The method also includes generating a demo workflow by (i) allowing the user to select a desired set of templates from the plurality of templates and (ii) interlinking the selected templates in an order specified by the user.

22 Claims, 9 Drawing Sheets

SYSTEMS AND METHODS FOR WEB CONTENT ORCHESTRATION

TECHNICAL FIELD

This application relates generally to systems, methods and apparatuses, including computer program products, for guiding a user to create one or more templates for assembling a demo workflow based on web content.

BACKGROUND

With increased competition in the market, various enterprises need tools that can help them sell their products in an effective and efficient way. For example, a sales demo can be used for showcasing and selling enterprise products to both current and potential clients. An existing demo application includes a configuration system that allows sales teams to pick and choose different combinations of product features that they want to demonstrate in the sales meetings. However, there are several shortcomings associated with the existing demo application. One shortcoming is that features in the demo can be outdated and different from what the client has in production, and any change to existing functionalities or addition of new functionalities in the sales demo application takes extensive business collaboration. Another shortcoming is that development effort, time, and money to have a demo ready can be too much for what is being delivered (e.g., only on a quarterly basis). Such quarterly release of features and functionalities in demo applications can restrict sales team during sales meetings. Further, the existing approach does not enable the sales team to show a seamless balance with future functionality, such as being able to preview products that will be available in the next 6-12 months, which would require in many instances a few screenshots of the demo flow to show the future vision. In general, building a demo workflow from the current demo environment can cause friction with a significant amount of back and forth on open questions and changes to the experience. Therefore, a much faster time-to-market demo experience is preferred so new experiences can be integrated into the demo platform more quickly and the sales team can have more accurate experiences to demo, which enables the team to highlight new experiences and/or rebid with existing clients. Further, systems and methods are needed to allow sales teams to curate sales demos for new and existing clients seamlessly, where the demos can showcase a large variety of products on an on-demand basis.

SUMMARY

The present invention features systems and methods for assembling sales demos that are customizable, such as with client branding on the homepage, multiple personas, and product offerings. In some embodiments, clickable buttons/ actions are embedded within a demo to allow sales teams to give thorough walkthroughs and/or allow clients to walk through themselves. In some embodiments, a user is able to make updates and changes quickly and easily to the demos whenever needed, while using less development effort to build and integrate functionalities. In addition, the demos can be shared with client in different formats to enhance the demo experience.

In one aspect, a computer-implemented method is provided for guiding a user to create one or more templates for assembling a demo workflow. The method comprises filtering, by the computing device, a plurality of web content uploaded by a user to remove unwanted material including references to external files and unreachable links so that the plurality of web content are stand-alone content. The method comprises presenting to the user, by the computing device, a graphical user interface for building a plurality of templates using the filtered web content. The graphical user interface is configured to allow the user to choose one or more filtered web content to populate each template, where each template comprises a page or a component of a page. The method also includes generating, by the computing device, a demo workflow by (i) allowing the user to select a desired set of templates from the plurality of templates and (ii) interlinking the selected templates in an order specified by the user. The method further includes enabling, by the computing device, the user to visually customize one or more of the templates in the demo workflow, including adding at least one of a logo, background color or theme.

In another aspect, a computer-implemented content management system is provided for guiding a user to create one or more templates for assembling a demo workflow. The system comprises a computing device having a memory for storing instructions, where the instructions, when executed, configure the computer-implemented content management system to provide a template engine, a content engine and a customization engine. The template engine is configured to filter a plurality of web content uploaded by the user to remove unwanted material including references to external files and unreachable links so that the plurality of web content are stand-alone content. The template engine is also configured to present to the user a graphical user interface for building a plurality of templates using the filtered web content. The graphical user interface is configured to allow the user to choose one or more filtered web content to populate each template. Each template comprises a page or a component of a page. The content engine configured to generate a demo workflow by (i) allowing the user to select a desired set of templates from the plurality of templates and (ii) interlinking the selected templates in an order specified by the user. The customization engine for enabling the user to visually customize one or more of the templates in the workflow by adding at least one of a logo, background color or theme.

Any of the above aspects can include one or more of the following features. In some embodiments, the demo workflow is published to the Internet as a webpage. In some embodiments, the user is allowed to download the demo workflow and serve the demo workflow offline on a local computing device without Internet connectivity. In some embodiments, the plurality of templates are stored in a central cloud repository. In some embodiments, the plurality of web content include one or more of webpages, reference user interfaces (RUIs), user experience design (UXD) prototypes, code snippets, and images from the webpages.

In some embodiments, the customization further comprises at least one of changing logos, updating text and related styles, inserting images, adding new sections or binding events to dynamic elements. In some embodiments, the customization further comprises presenting a list of tools selectable by the user for customizing a component of a template page. In some embodiments, interlinking the selected templates comprises embedding one or more user-clickable links or buttons in the templates to allow traversal among the templates in the demo workflow. In some embodiments, a template further comprises a group of templates linked together to form a sub-flow. In some embodiments, building the plurality of templates and generating the demo workflow from the plurality of templates are accomplished graphically without the user writing a code.

In some embodiments, a metadata file is generated and maintained for each of the plurality of templates and the demo workflow. In some embodiments, the user is allowed to create multiple versions of the same template or demo workflow over time. In some embodiments, the plurality of templates are usable for a different demo workflow. In some embodiments, user privilege for generating the plurality of templates and the demo workflow is controlled.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
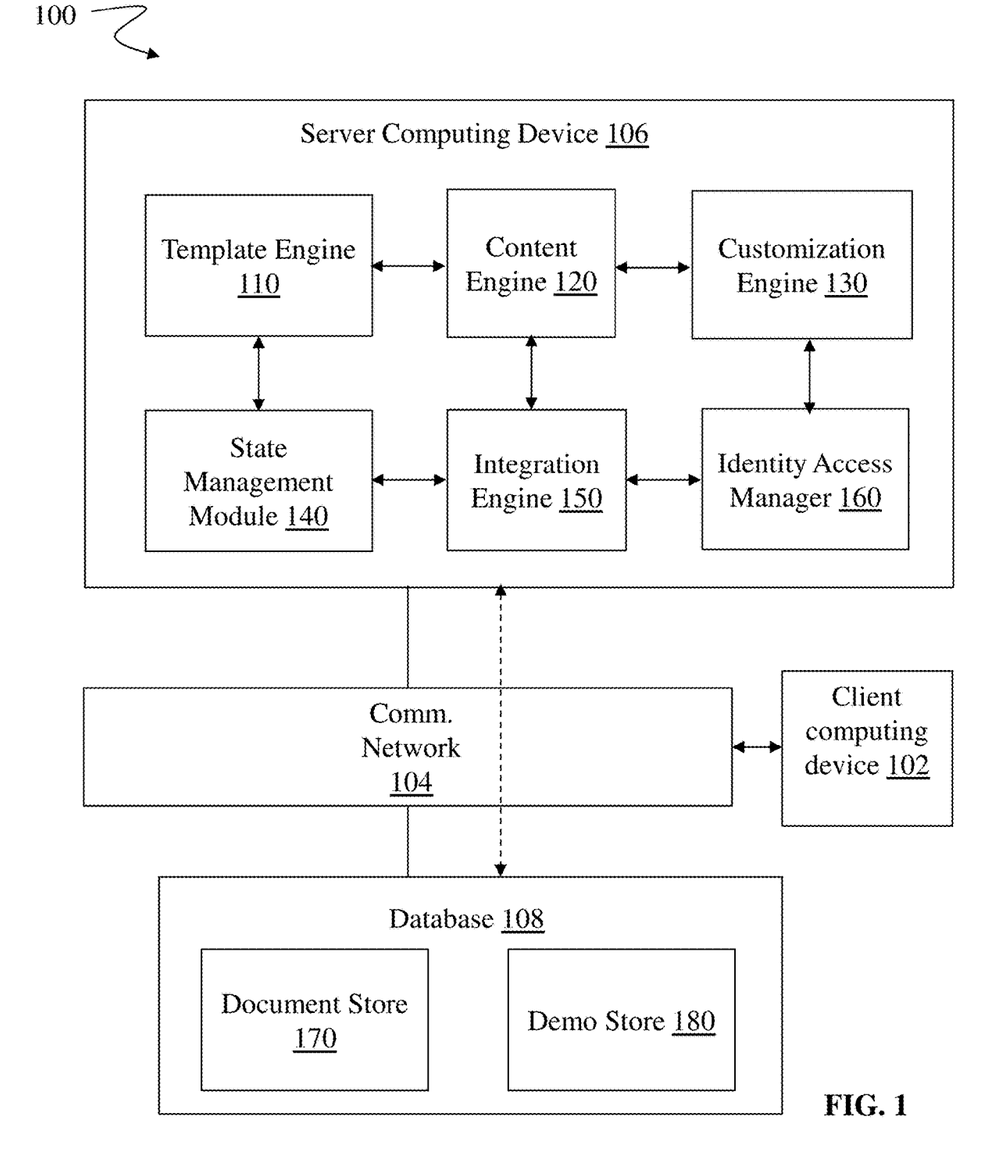
FIG. 1 shows an exemplary diagram of a content orchestration system used in a computing environment to create templates and demo workflows, according to some embodiments of the present invention.

FIG. 1 shows an exemplary diagram of a content orchestration system 100 used in a computing environment to create templates and demo workflows, according to some embodiments of the present invention. As shown, the content orchestration system 100 generally includes a client computing device 102, a communication network 104, a server computing device 106 and a database 108.

The client computing device 102 connects to the communication network 104 to communicate with the server computing device 106 and/or the database 108 to provide inputs and receive outputs relating to the process of creating one or more templates for assembling a demo flow as described herein. For example, the client computing device 102 can display to a user a detailed graphical user interface (GUI) that allows the user to track/view pertinent software development data in a user-configuration display environment. Exemplary client computing devices 102 include, but are not limited to, desktop computers, laptop computers, tablets, mobile devices, smartphones, and internet appliances. In some embodiments, a user accesses the server computing device 106 via an Application Programming Interface (API) connected to the client computing device 102. It should be appreciated that other types of computing devices that are capable of connecting to the components of the content orchestration system 100 can be used without departing from the scope of invention. Although FIG. 1 depicts a single client device 102, it should be appreciated that the content orchestration system 100 can include any number of client devices.

The communication network 104 enables components of the content orchestration system 100 to communicate with each other to perform the process of template and workflow creation. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more processors and one or more physical memory modules and specialized software engines that execute on the processor of the server computing device 106, to receive data from other components of the content orchestration system 100, transmit data to other components of the system 100, and perform functions as described herein. As shown, the processor of the server computing device 106 executes a template engine 110, a content engine 120, a customization engine 130, a state management module 140 and an integration engine 150, where the sub-components and functionalities of these components are described below in detail. In some embodiments, the components 110, 120, 130, 140, 150 and 160 of the server computing device 106 are specialized sets of computer software instructions programmed onto a dedicated processor in the server computing device 106 and can include specifically-designated memory locations and/or registers for executing the specialized computer software instructions.

The database 108 is a computing device (or in some embodiments, a set of computing devices) that is coupled to and in data communication with the server computing device 106 and is configured to provide, receive and store various types of data needed and created for creating templates and workflows, as described below in detail. In some embodiments, all or a portion of the database 108 is integrated with the server computing device 106 or located on a separate computing device or devices. For example, the database 108 can comprise one or more databases, such as MySQL™ available from Oracle Corp. of Redwood City, Calif. In some embodiments, the database 108 is cloud-based repository that includes a document store 170 and a demo store 180. The document store 170 is configured to store templates generated by the template engine 110, including the first/base version of each template and any newer version with subsequent changes and uploads. The demo store 180 is configured to store demo workflows generated by the content engine 120.

Figure 2:
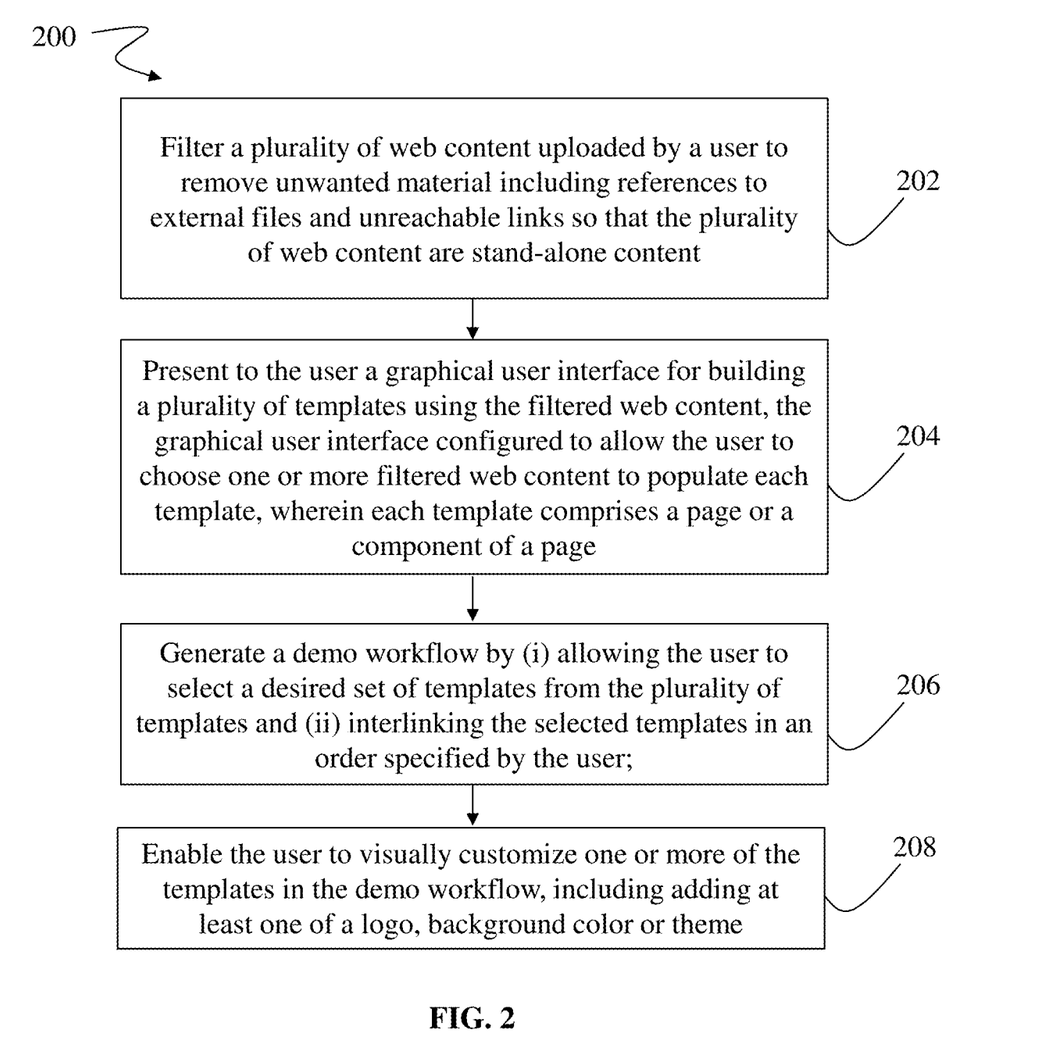
FIG. 2 shows an exemplary process implemented by the content orchestration system of FIG. 1 to create templates and demo workflows, according to some embodiments of the present invention.

FIG. 2 shows an exemplary process 200 implemented by the content orchestration system 100 of FIG. 1 to create templates and demo workflows, according to some embodiments of the present invention. In general, the process 200, in connection with the content orchestration system 100, allows a user to generate web content in the form of templates on the fly, which reduces the time, effort, and resources to develop and replicate functionalities. These templates are reusable and can be stitched together as a series of interlinked webpages (hereinafter referred to as a demo workflow) to produce a demo experience based on the story the user wants to present. Further, the process 200, in conjunction with the system 100, can manage user identities and accesses, thus controlling, and protecting the content from being modified or deleted by other users.

The exemplary process 200 starts with the template engine 110 receiving web content uploaded by a user and filtering the web content to remove unwanted material, including references to external files and unreachable links, so that the web content are stand-alone content (step 202). The web content can be webpages, Reference user interfaces (RUIs), user experience design (UXD) prototypes, code snippets, scrollable images of the webpages, etc. For example, if the web content is a HTML file, it can include unwanted scripts and links. In this case, the template engine 110 is configured to scan the HTML file and remove the script tags and references to any external script files. In addition, unreachable URLs (e.g., used in <link> and <img>tags) can be replaced with base 64 encrypted data URLs, which enables the user to upload once for use anywhere. Further, the user can upload images and CSS files. In some embodiments, uploaded files are converted into binary base 64 data URLs and these URLs are used as the source of subsequent <img> and <link>tags when building a template page or component.

The template engine 110 can present to the user a graphical user interface for building one or more templates using the filtered web content, where each template can be a page or a component of a page (step 204). The graphical user interface is configured to allow the user to choose one or more filtered web content to populate each template. In some embodiments, the graphical user interface is a part of a built-in editor. In some embodiments, the graphical user interface is a part of a wizard configured to walk the user through the process of adding and uploading web content. In the case that a built-in editor is used to create a template, the editor is configured to copy and/or write HTML content selected by a user, after the content is scanned by the template engine 110 to provide a list of necessary assets. In some embodiments, the template engine 110 is adapted to receive static files uploaded by the user, such as CSS and JS files, or write inline. Once uploaded, the template engine 110 can process the selected static content and present a preview of the resulting template. In the case that a wizard is used to create a template, once the user has uploaded all the necessary files for the template, the user can follow a series of hints provided by the wizard and select the files to form a template.

Figure 3:
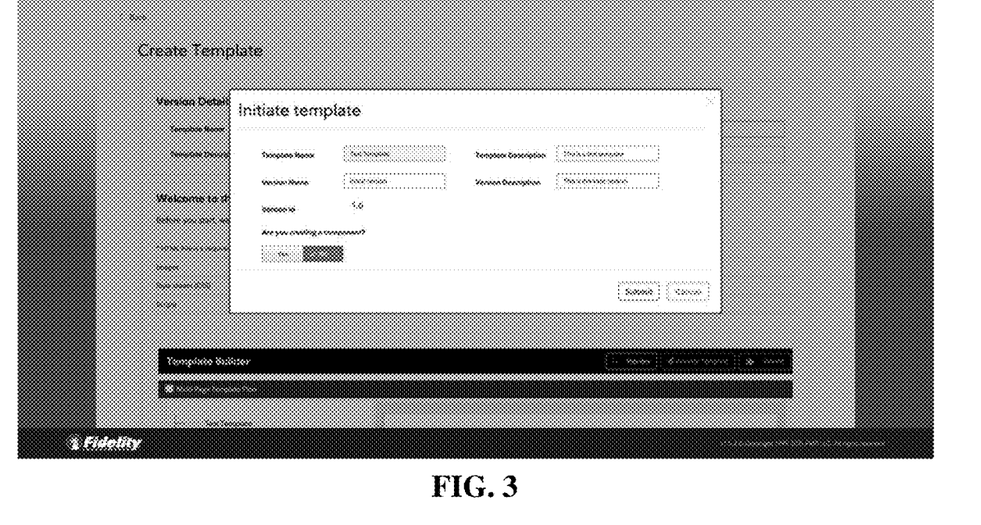
FIG. 3 shows an exemplary user interface provided by the template engine of the content orchestration system of FIG. 1 to allow a user to initiate the creation of a new template, according to some embodiments of the present invention.
Figure 4:
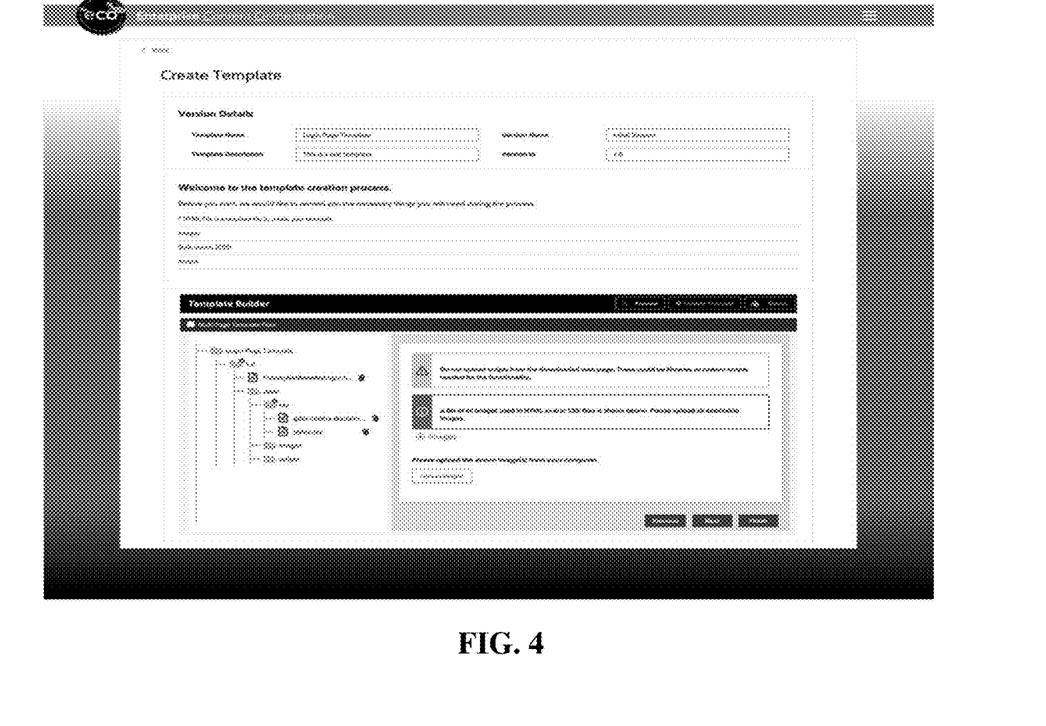
FIG. 4 shows an exemplary user interface provided by the template engine of the content orchestration system of FIG. 1 to allow a user to upload an image file to populate the template initialized in FIG. 3, according to some embodiments of the present invention.
Figure 5:
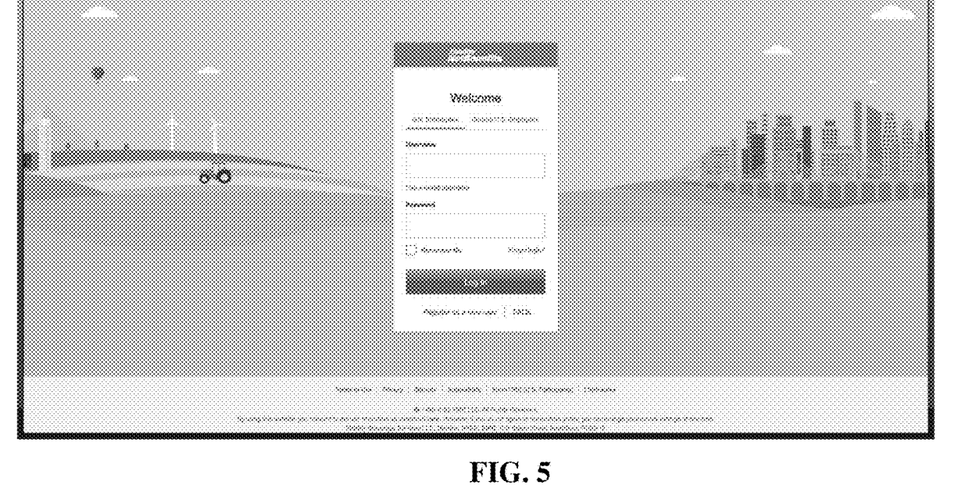
FIG. 5 shows an exemplary user interface provided by the template engine of the content orchestration system of FIG. 1 to allow a user to preview the template created in FIGS. 3 and 4, according to some embodiments of the present invention.

FIG. 3 shows an exemplary user interface provided by the template engine 110 to allow a user to initiate the creation of a new template, according to some embodiments of the present invention. FIG. 4 shows an exemplary user interface provided by the template engine 110 to allow a user to upload an image file to populate the template initialized in FIG. 3, according to some embodiments of the present invention. The template engine 110 can also provide similar user interfaces to allow the user to upload other types of files (e.g., HTML files) when creating the template. FIG. 5 shows an exemplary user interface provided by the template engine 110 to allow a user to preview the template created in FIGS. 3 and 4 prior to saving the template to the document store 170, according to some embodiments of the present invention.

Figure 6:
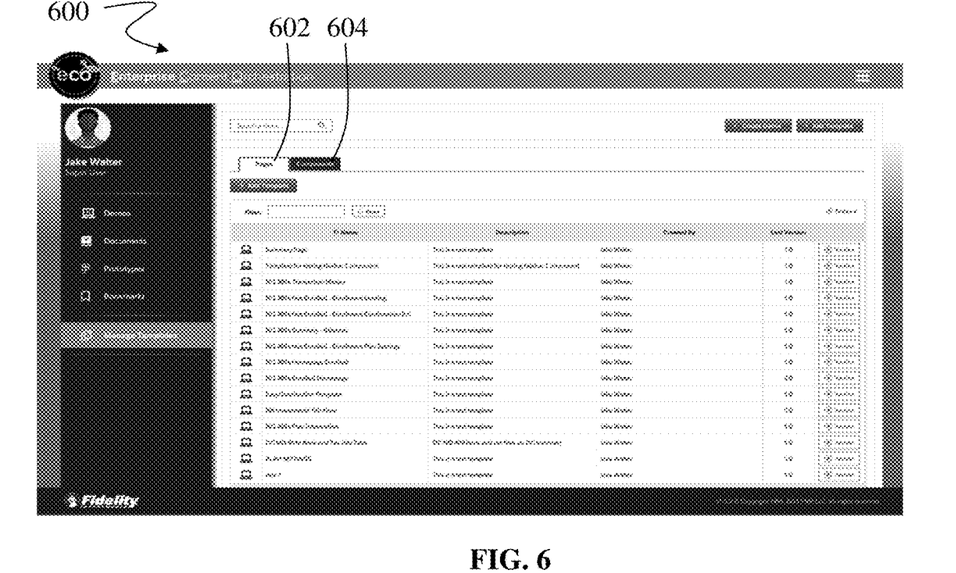
FIG. 6 illustrates an exemplary user interface provided by the template engine of the content orchestration system of FIG. 1 that provides a list of templates generated, according to some embodiments of the present invention.

In some embodiments, the template generated by the template engine 110 is in the form of a complete page. Alternatively, the template engine 110 can generate one or more smaller components that can be embedded as a section in a page. In some embodiments, a template comprises a group of individual templates that can be linked together to form a sub-flow. In some embodiments, the template engine 110 allows the user to create a clone template of an existing temple. A clone template can be stored as a version of the original template. Thus, the template engine 110 is capable of providing multiple versions of substantially the same content, which is important as it enables the user to showcase current and future functionalities in a demo. In some embodiments, if the user is satisfied with the template, a publisher module of the template engine 110 can then publish the template. In addition, the user can choose to upload the template to the document store 170 for storage. FIG. 6 illustrates an exemplary user interface 600 provided by the template engine 110 of the content orchestration system 100 of FIG. 1 that provides a list of templates generated, according to some embodiments of the present invention. As shown, the user interface 600 is configured to show a section 602 with a list of templates created in the form of complete pages and another section 604 with a list of templates created in the form of components embeddable into a page and/or a demo workflow.

Referring back to FIG. 2, from the templates created by the user using the template engine 110, the user can utilize the content engine 120 to build a demo workflow, where the content engine 120 allows the user to select a desired set of templates from the document store 170 and interlink the selected templates in an order specified by the user to form the workflow (step 206 of process 200). In an exemplary workflow assembly process, the content engine 120 is configured to allow the user to add a template to the workflow by either (i) choosing from a set of existing templates previously created or (ii) creating an inline template during the workflow creation process by invoking the template engine 110. An existing template can be downloaded from the document store 170 and may not need any changes unless the user needs to apply customizations to the downloaded template using the customization engine 130, as described in detail below. If the user wants to create a new inline template, the template engine 110 can guide the user through the process of template creation and uploading the template to the document store 170 thereafter as describe in detail above.

Figure 7:
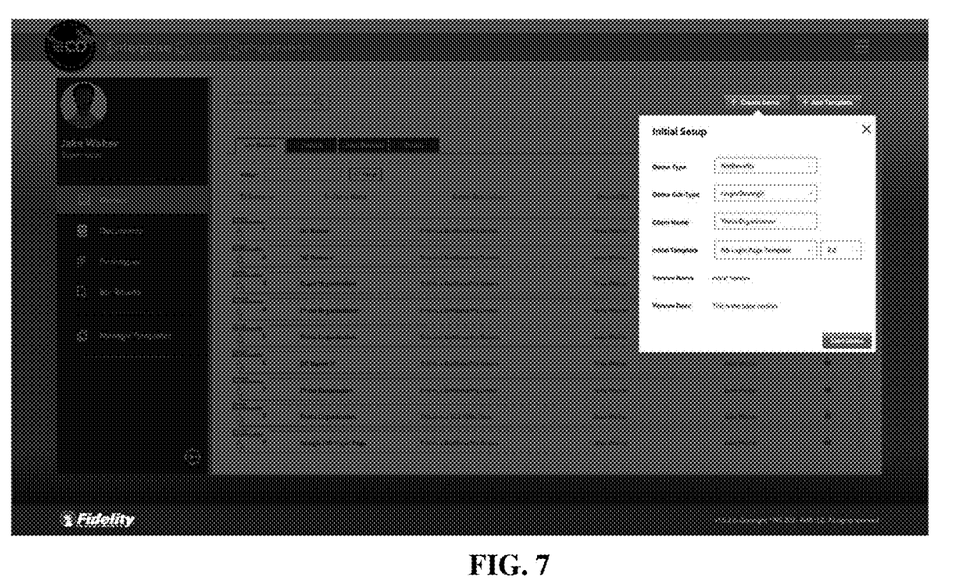
FIG. 7 shows an exemplary user interface provided by the content engine of the content orchestration system of FIG. 1 to allow a user to initiate creation of a new demo workflow, according to some embodiments of the present invention.
Figure 8:
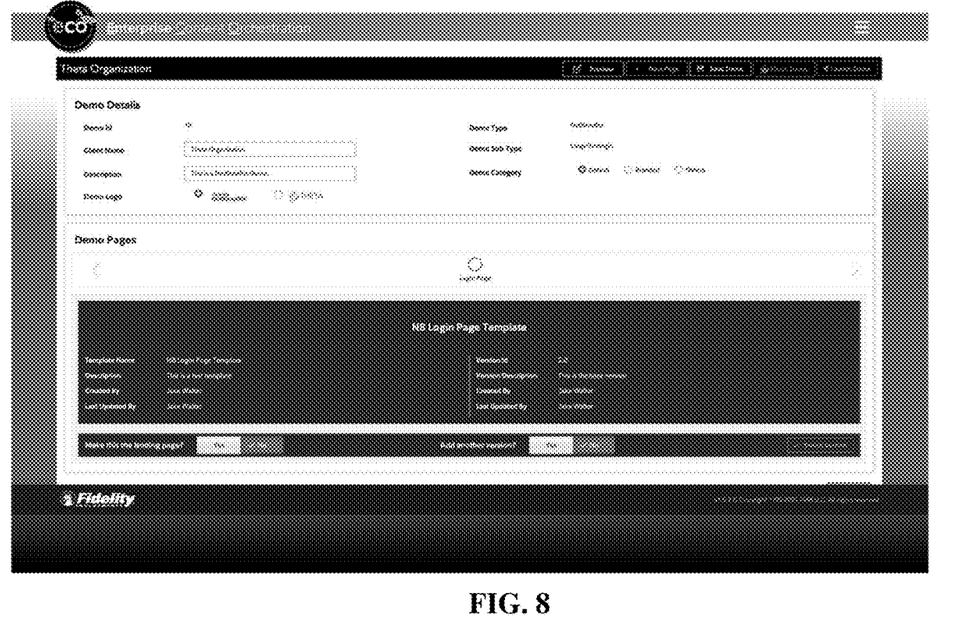
FIG. 8 shows an exemplary user interface provided by the content engine of the content orchestration system of FIG. 1 that displays the template selected by the user via the interface of FIG. 7, according to some embodiments of the present invention.

To access a desired template, the content engine 120 gathers basic information about the template, including the initial template version, and downloads a copy of the template with the specified template version from the document store 170. FIG. 7 shows an exemplary user interface provided by the content engine 120 to allow a user to initiate creation of a new demo workflow, according to some embodiments of the present invention. As shown, via this interface, the content engine 120 can gather some basic information for the new demo workflow, including demo type, sub-type, client name, initial template to be added to the workflow, version name/description for the initial template, etc. The content engine 120 can then add that downloaded template to the demo workflow in the order it is downloaded. FIG. 8 shows an exemplary user interface provided by the content engine 120 that displays the template selected by the user via the interface of FIG. 7, according to some embodiments of the present invention. This template page serves as a landing/first page of the workflow being created.

Figure 9:
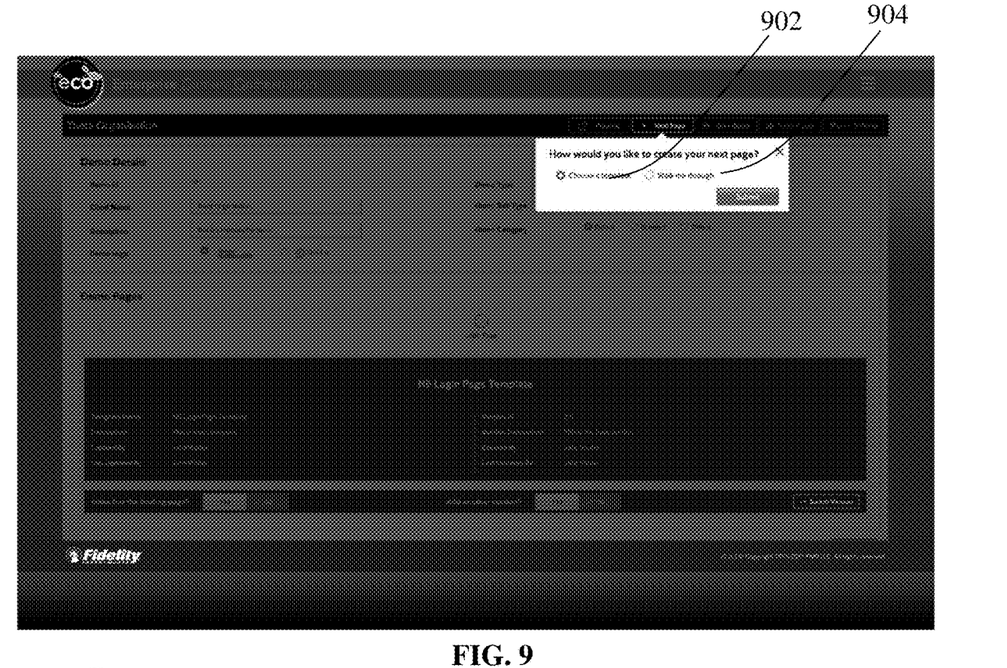
FIG. 9 shows an exemplary user interface provided by the content engine of the content orchestration system of FIG. 1 that allows the user to add and/or create the next page to the workflow of FIGS. 7 and 8, according to some embodiments of the present invention.
Figure 10:
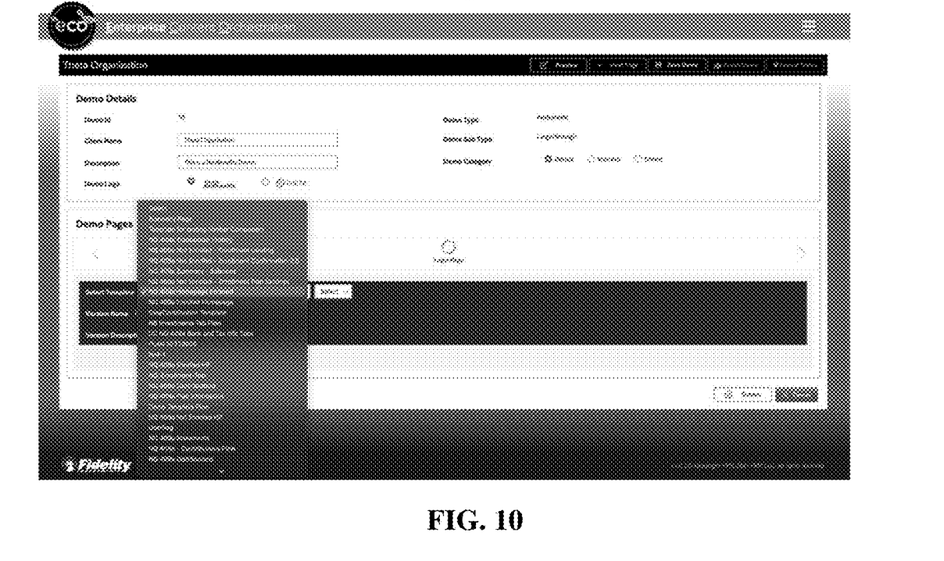
FIG. 10 shows an exemplary user interface provided by the content engine of the content orchestration system of FIG. 1 that allows the user to select an existing template as the next page for the workflow, according to some embodiments of the present invention.
Figure 11:
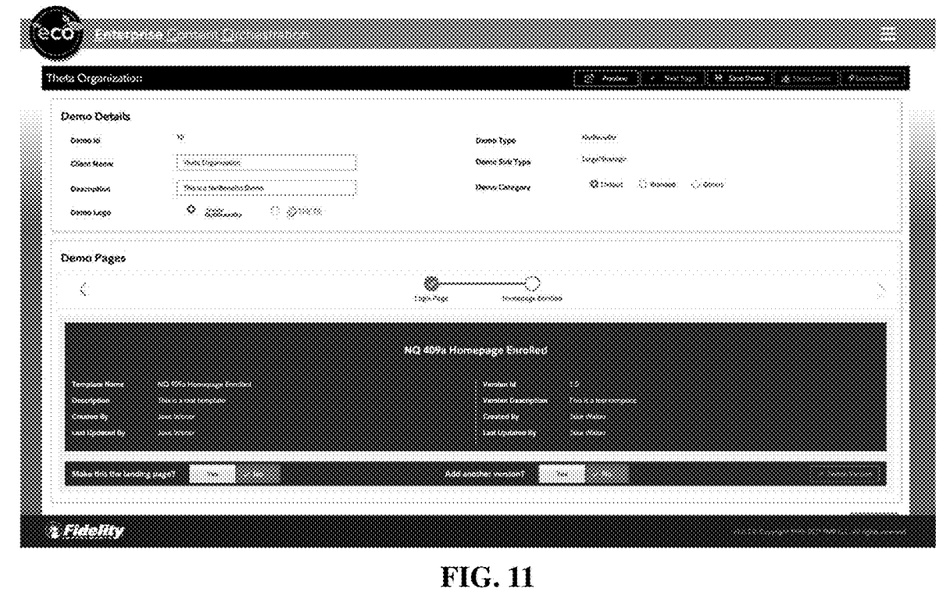
FIG. 11 shows an exemplary user interface provided by the content engine of the content orchestration system of FIG. 1 that displays the next page of the demo workflow, according to some embodiments of the present invention.

In some embodiments, the content engine 120 provides a set of toolsets to the user to design/customize the demo workflow. Exemplary toolsets can include a progress indicator allowing a user to traverse between templates/pages and a version switch to toggle between different template versions. Another exemplary tool can allow the user to add interactions among the templates, such as options for linking an element in a current template to another template to form a part of the workflow. In general, one or more user-clickable links or buttons can be embedded in a template to allow traversal among the templates in the demo workflow. Other exemplary toolsets include customization tools that allow the user to add various customizations to a template in cooperation with the customization engine 130. This process can be repeated for each desired template page of the workflow until the workflow is fully assembled. FIG. 9 shows an exemplary user interface provided by the content engine 120 that allows the user to add and/or create the next page to the workflow of FIGS. 7 and 8, according to some embodiments of the present invention. As shown, the user has an option of choosing an existing template 902 or creating an inline template 904 as the next page for the demo workflow. FIG. 10 shows an exemplary user interface provided by the content engine 120 that allows the user to select an existing template as the next page for the workflow in response to the user choosing the existing template option 902 from the user interface of FIG. 9, according to some embodiments of the present invention. FIG. 11 shows an exemplary user interface provided by the content engine 120 that displays the next page of the demo workflow, according to some embodiments of the present invention. As shown, the next page is inserted into the workflow subsequent to the landing/initial page, which is created using the process described above with reference to FIG. 8.

Figure 12:
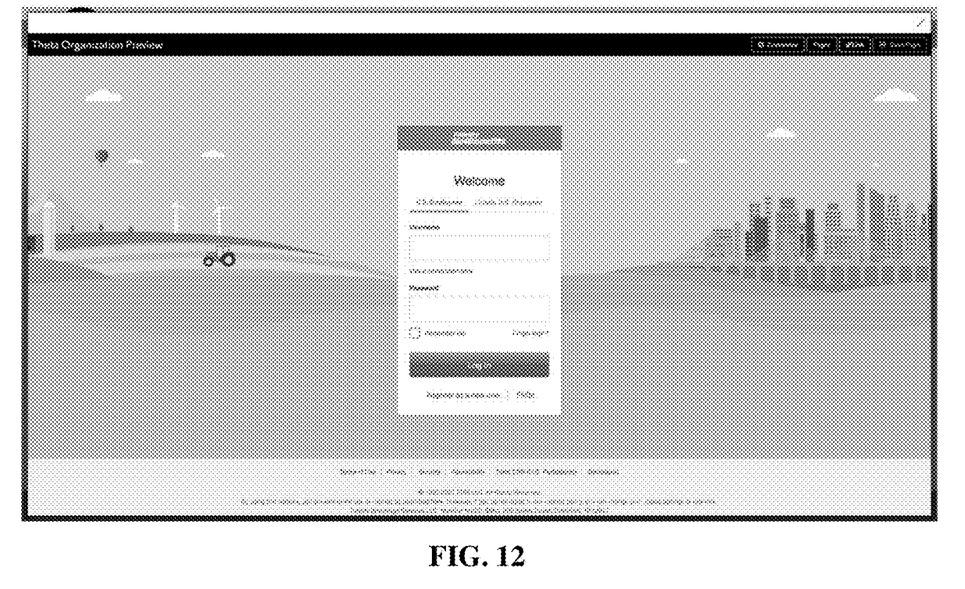
FIG. 12 shows an exemplary user interface provided by the content engine of the content orchestration system of FIG. 1 to allow a user to preview the workflow created in FIGS. 7-11, according to some embodiments of the present invention.
Figure 13:
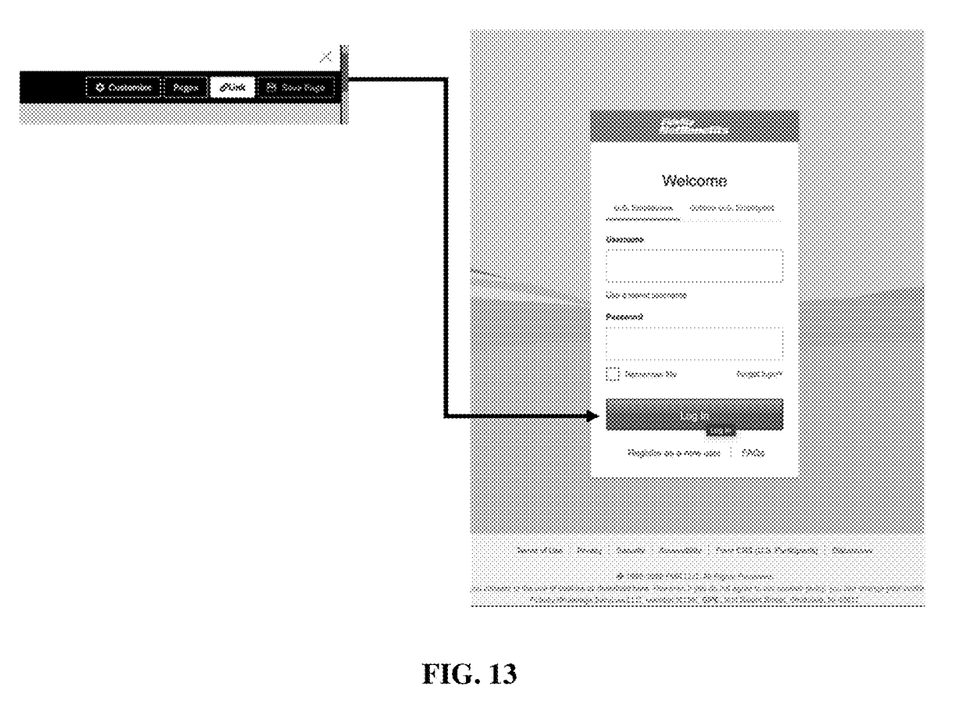
FIG. 13 shows an exemplary user interface provided by the content engine of the content orchestration system of FIG. 1 to allow a user to add a link to a component of a template page for the workflow created from FIGS. 7-12, according to some embodiments of the present invention.
Figure 14:
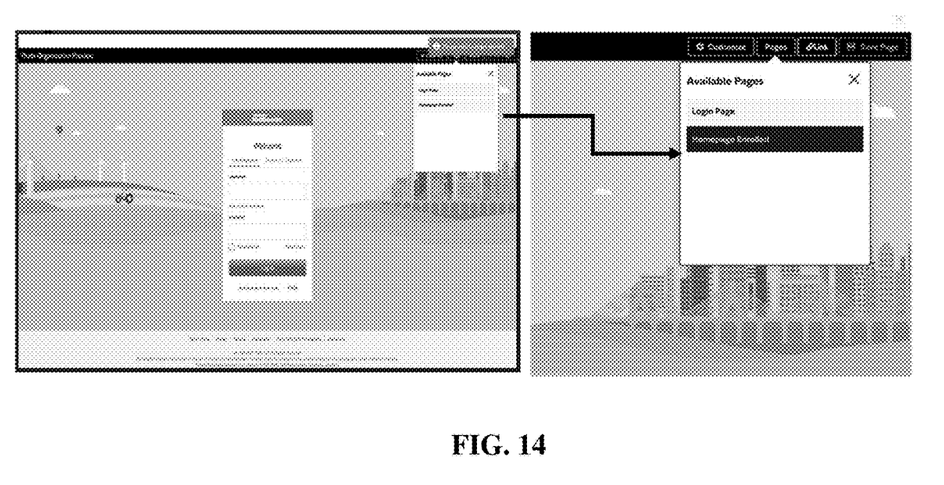
FIG. 14 shows an exemplary user interface provided by the content engine of the content orchestration system of FIG. 1 to allow a user to link the second template page to the first template page of the workflow created from FIGS. 7-12, according to some embodiments of the present invention.

In some embodiments, the content Engine 120 is further configured to provide a preview area where the user can preview the workflow created. FIG. 12 shows an exemplary user interface provided by the content engine 120 to allow a user to preview the 2-page workflow created in FIGS. 7-11 prior to saving the template to the demo store 170, according to some embodiments of the present invention. FIG. 13 shows an exemplary user interface provided by the content engine 120 to allow a user to add a link to a component (e.g., the login button) of a template page for the workflow created from FIGS. 7-12, according to some embodiments of the present invention. FIG. 14 shows an exemplary user interface provided by the content engine 120 to allow a user to link the second template page to the first template page of the workflow created from FIGS. 7-12, according to some embodiments of the present invention.

Figure 15:
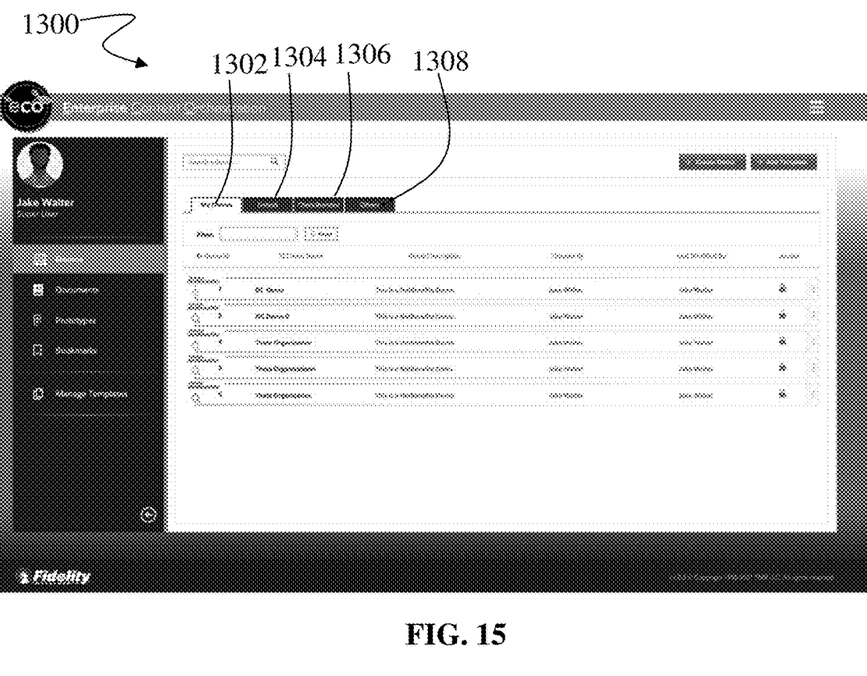
FIG. 15 shows an exemplary user interface provided by the content engine of the content orchestration system of FIG. 1 that allows the user access a list of available demo workflows, according to some embodiments of the present invention.

If a user chooses to save a demo workflow, the content engine 120 can upload the latest version to the demo store 180. In some embodiments, as the user adds different templates to a demo workflow, the content engine 120 can asynchronously or synchronously publish the template added. The content engine 120 can publish the demo workflow to the public via the Internet, where the demo is hosted as a webpage. FIG. 15 shows an exemplary user interface provided by the content engine 120 that allows the user access a list of available demo workflows, according to some embodiments of the present invention. The user interface 1300 is configured to show a My Demos section 1302 with a list of demo workflows created by the current user, a Default Demos section 1304 with a list of demo workflows prebuilt for reference purposes, and a Client Branded Demos 1306 section with a list of demo workflows branded for specific clients.

Referring back to FIG. 2, a user can utilize the customization engine 130 to modify content in a template and/or a demo workflow visually, e.g., without writing a line of code (step 208). When the content engine 120 imports and orchestrates the select templates in a demo workflow, these templates already include details populated by the template engine 110 at step 202. The customization engine 120 provides the user with the flexibility to change one or more parts of a template after a demo workflow is created. Exemplary customizations include, but are not limited to, add and/or update client Branding (e.g., Client logo, colors, and themes, etc.), add and/or update styles and texts to an element, toggle element display, add and/or update section, add and/or update inline CSS and/or script, replace a section with image, create a sequence, add and/or update hot links, insert component (or another template), prefill value, and remove, insert, clone, swap or move a component. In some embodiments, the components inserted into a template is retrieved by the user from the document store 170.

In some embodiments, the state management module 140 of the content orchestration system 100 is configure to manage changes in state of a template and/or a workflow upon automatic detection of an event, such as date change or an event triggered by a user. For instance, a new user registration flow is not shown in the same session once the registration flow is completed. During the demo creation process, a user can enlist a particular template or workflow to be monitored by the state management module 140. The enlisting requires recommendation from the user to either hide a workflow or replace a workflow with another workflow. The state management module 140 can automate this process without needing the user to write any code.

In some embodiments, the integration engine 150 enables multiple demo workflows to be integrated with each other so that the user can toggle between different demo workflows without having the need to have all the workflows opened at once, which can force the user to switch screens. This functionality also plays an important role in state management by the state management module 140 where different demo workflows can represent different flows themselves. In addition, the integration engine 150 can integrate standalone UXD prototypes into a template or demo workflow.

In some embodiments, the identity access manager 160 controls and limits access privilege to the content orchestration system 100 based on user roles. The users can be classified into various different user groups with different degrees of access, such as super users, sales/product teams, and development teams.

In some embodiments, the content orchestration system 100 provides an installer that allows a user to install an offline tool that serves the demo workflow offline. Thus, with this installer, the user does not need to rely on the online version of the demo workflow, but can down the workflow in a local computing device and can serve the demo flow offline without Internet connectivity required. This is advantageous over existing prototyping tools that require constant connection to the Internet, which may affect the performance of the webpages when there is slow or no Internet connection. Since, a sales team need to demo products within a very short span of time, slowness in or no Internet connection may be a key factor in the success and failure of the demo experience.

In another aspect, when content is generated by the process 200 of FIG. 2, two pieces of information are generated, including (i) the content itself which can be stored as documents and (ii) its corresponding metadata file, which can be stored as JSON files. The metadata serves as a mechanism to provide key information about the content so that the subsystems of the content orchestration system 100 can complete their tasks accordingly. In some embodiments, there are 5 different types of metadata files used by system 100, including metadata for templates, metadata for components, metadata for prototypes, metadata for documents, and metadata for demo workflows. In some embodiments, these metadata files are stored in the document store 170 and/or the demo store 180.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®, Google® Cloud).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for guiding a user to create one or more templates for assembling a demo workflow, the method comprising:
    filtering, by the computing device, a plurality of web content uploaded by a user to remove unwanted material including references to external files and unreachable links so that the plurality of web content are stand-alone content;
    presenting to the user, by the computing device, a graphical user interface for building a plurality of templates using the filtered web content, the graphical user interface configured to allow the user to choose one or more filtered web content to populate each template, wherein each template comprises a page or a component of a page;
    generating, by the computing device, a demo workflow by (i) allowing the user to select a desired set of templates from the plurality of templates and (ii) interlinking the selected templates in an order specified by the user; and
    enabling, by the computing device, the user to visually customize one or more of the templates in the demo workflow, including adding at least one of a logo, background color or theme.

2. The computer-implemented method of claim 1, further comprising publishing the demo workflow to the Internet as a webpage.

3. The computer-implemented method of claim 1, further comprising allowing the user to download the demo workflow and serve the demo workflow offline on a local computing device without Internet connectivity.

4. The computer-implemented method of claim 1, further comprising storing the plurality of templates in a central cloud repository.

5. The computer-implemented method of claim 1, wherein the plurality of web content include one or more of webpages, reference user interfaces (RUIs), user experience design (UXD) prototypes, code snippets, and images from the webpages.

6. The computer-implemented method of claim 1, wherein the customization further comprises at least one of changing logos, updating text and related styles, inserting images, adding new sections or binding events to dynamic elements.

7. The computer-implemented method of claim 1, wherein the customization further comprises presenting a list of tools selectable by the user for customizing a component of a template page.

8. The computer-implemented method of claim 1, further comprising generating and maintaining a metadata file for each of the plurality of templates and the demo workflow.

9. The computer-implemented method of claim 1, wherein interlinking the selected templates comprises embedding one or more user-clickable links or buttons in the templates to allow traversal among the templates in the demo workflow.

10. The computer-implemented method of claim 1, further comprising allowing the user create multiple versions of the same template or demo workflow over time.

11. The computer-implemented method of claim 1, further comprising making the plurality of templates usable for a different demo workflow.

12. The computer-implemented method of claim 1, further comprising controlling user privilege for generating the plurality of templates and the demo workflow.

13. The computer-implemented method of claim 1, wherein a template further comprises a group of templates linked together to form a sub-flow.

14. The computer-implemented method of claim 1, wherein building the plurality of templates and generating the demo workflow from the plurality of templates are accomplished graphically without the user writing a code.

15. The computer-implemented content management system of claim 14, further comprising an installer configured to allow the user to download the demo workflow and serve the demo workflow offline on a local computing device without Internet connectivity.

16. A computer-implemented content management system for guiding a user to create one or more templates for assembling a demo workflow, the system comprising a computing device having a memory for storing instructions, wherein the instructions, when executed, configure the computer-implemented content management system to provide:
   a template engine configured to:
      filter a plurality of web content uploaded by the user to remove unwanted material including references to external files and unreachable links so that the plurality of web content are stand-alone content; and
      present to the user a graphical user interface for building a plurality of templates using the filtered web content, the graphical user interface configured to allow the user to choose one or more filtered web content to populate each template, wherein each template comprises a page or a component of a page;
   a content engine configured to generate a demo workflow by (i) allowing the user to select a desired set of templates from the plurality of templates and (ii) interlinking the selected templates in an order specified by the user; and
   a customization engine for enabling the user to visually customize one or more of the templates in the workflow by adding at least one of a logo, background color or theme.

17. The computer-implemented content management system of claim 16, further comprising a cloud-based document store and a cloud-based demo store, wherein the document store is configured to store the plurality of templates and the demo store is configured to store the demo workflow.

18. The computer-implement content management system of claim 17, wherein at least one of the document store or the demo store is further configured to store one or more metadata files for each of the plurality of templates and the demo workflow.

19. The computer-implemented content management system of claim 16, wherein the content engine is further configured to publish the demo workflow to the Internet as a webpage.

20. The computer-implemented content management system of claim 16, wherein the plurality of web content include one or more of webpages, reference user interfaces (RUIs), user experience design (UXD) prototypes, code snippets, and images from the webpages.

21. The computer-implemented content management system of claim 16, wherein the customization engine is further configured to enable the user to perform at least one of changing logos, updating text and related styles, inserting images, adding new sections or binding events to dynamic elements.

22. The computer-implemented content management system of claim 16, wherein the plurality of templates and the demo are generated graphically without the user writing a code.

* * * * *